(12) United States Patent
Akiyama et al.

(10) Patent No.: US 6,909,677 B1
(45) Date of Patent: Jun. 21, 2005

(54) OPTICAL DISK, OPTICAL REPRODUCTION DEVICE, AND OPTICAL RECORDING DEVICE

(75) Inventors: Jun Akiyama, Kashihara (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/560,522

(22) Filed: Apr. 28, 2000

(30) Foreign Application Priority Data

Apr. 28, 1999 (JP) .......................................... 11-121104

(51) Int. Cl.[7] .................................................. G11B 7/00
(52) U.S. Cl. ............................... 369/47.27; 369/59.25; 369/275.3
(58) Field of Search .................... 369/44.26, 44.34, 369/47.36, 47.37, 47.38, 275.3, 275.4, 59.25, 47.27, 47.28, 124.07, 275.1

(56) References Cited

U.S. PATENT DOCUMENTS

| 4,748,611 | A | * | 5/1988 | Tsuyoshi et al. ........... 369/59.2 |
|---|---|---|---|---|
| 5,132,954 | A | | 7/1992 | Kulakowski et al. ......... 369/48 |
| 5,293,565 | A | | 3/1994 | Jaquette et al. ............... 369/32 |
| 5,377,178 | A | * | 12/1994 | Saito et al. ............ 369/124.07 |
| 5,475,540 | A | * | 12/1995 | Gold ........................... 360/48 |
| 5,625,620 | A | * | 4/1997 | Fukushima et al. ...... 369/275.3 |
| 5,661,708 | A | * | 8/1997 | Yamawaki ............... 369/47.22 |
| 5,978,350 | A | * | 11/1999 | Tobita et al. ............ 369/275.1 |
| 5,982,718 | A | * | 11/1999 | Takiguchi ................ 369/124.1 |
| 6,069,870 | A | * | 5/2000 | Maeda et al. ............ 369/275.4 |
| 6,215,758 | B1 | * | 4/2001 | Horimai et al. .......... 369/275.3 |
| 6,292,451 | B1 | * | 9/2001 | Minoru et al. ........... 369/59.14 |

FOREIGN PATENT DOCUMENTS

| JP | 06-150329 | 5/1994 |
|---|---|---|
| JP | 07-093905 | 4/1995 |
| JP | 09-212937 | 8/1997 |
| JP | 10-334607 | 12/1998 |
| JP | 11-016216 | 1/1999 |

* cited by examiner

*Primary Examiner*—Thang V. Tran
*Assistant Examiner*—Bach Vuong
(74) *Attorney, Agent, or Firm*—David G. Conlin; David A. Tucker; Edwards & Angell, LLP

(57) ABSTRACT

An optical disk has a recording track constituted by sectors arranged in a concentric or spiral form. Each sector is divided into segments, and each segment includes a data field where data is recorded and a clock mark field having a different light reflectance from that of the data field. The data field in the sector has synchronization patterns S. Hence, a highly reliable optical disk, optical reproduction device, and optical recording device can be offered that are capable of performing recording and reproduction even if a clock mark is defective due to a flaw.

16 Claims, 8 Drawing Sheets

F I G. 1 (a) | AS 0 | AS 1 | AS 1 | DS 0 | DS 1 | ... | DS 43 | DS 44 |

F I G. 1 (b) | CM field | Pre-Amble field | Address field | Reserve |

F I G. 1 (c) | CM field | Pre-Write field | Data field | Post-Write field |

FIG. 2

| SEGMENT NUMBER | DS0 | DS1 | DS2 | DS3 | ... | DS43 | DS44 |
|---|---|---|---|---|---|---|---|
| RECORDING DATA | Header | S Data | Data | S Data | ... | S Data | Data |

FIG. 6 (a) PRIOR ART

| AS 0 | DS 0 | DS 1 | ... | DS 43 | DS 44 |

FIG. 6 (b) PRIOR ART

| CM field | Pre-Amble field | Address field | Reserve |

FIG. 6 (c) PRIOR ART

| CM field | Data field |

OPTICAL DISK, OPTICAL REPRODUCTION DEVICE, AND OPTICAL RECORDING DEVICE

FIELD OF THE INVENTION

The present invention relates to optical disks and optical disk devices, and in particular, to optical disks, optical reproduction devices, and optical recording devices that are capable of preforming reliable recording and reproduction.

BACKGROUND OF THE INVENTION

We have in recent years witnessed digital information being offered in dramatically increasing quantities, as various contents including video and audio have become available in digital format. In response to this trend, development is under way to design optical disk devices suitable to increasing capacity and density. Meanwhile, considering that the quality of reproduction signals deteriorates with increase in density, various solutions are suggested to improve the quality of reproduction signals.

Reproduction signals carry, in addition to image and other main information, servo information and other various kinds of control and management information. Among those kinds of information, clock information is one of the most important, because it serves as a reference for operations of all the circuits that record or reproduce information. Japanese Laid-Open Patent Application No. 11-16216/1999 (Tokukaihei 11-16216; published on Jan. 22, 1999) discloses an optical disk and an optical disk device that are capable of performing error-free readout with improved clock information quality.

The above conventional optical disk and optical disk device will be further explained in the following.

First, the format of the optical disk will be explained. FIG. 6(a) shows an arrangement of a sector. Each sector is divided into 46 segments. Each segment serves either as an address segment or as a data segment. Here, AS0 located at the head of the sector serves as an address segment, while DS0 to DS44 as data segments.

FIG. 6(b) shows an arrangement of an address segment. The address segment includes a clock mark field (CM field), an address field, a preamble field, and other fields. In each field, a predetermined signal is recorded in advance in the form of a variation in the shape of a pit or groove.

The clock mark field records in advance a clock mark from which a clock signal is generated as mentioned in the foregoing. The address field records the address of the sector. The other fields are provided as necessary so as to control address readout or ensure a readout margin.

FIG. 6(c) shows an arrangement of a data segment. The data segment includes a clock mark field (CM field) at its head as does the address segment. The other field serves as a data field, where main information is recorded and reproduced by a magneto-optical recording technique. Each segment is 63.5 byte long, for example. Clock marks are then found at identical intervals equaling 63.5 bytes.

Next, the clock mark will be explained. FIG. 7 shows a clock mark on the disk. The clock mark is formed in the form of a convexity in the groove and of a concavity in the land as shown in FIG. 7, causing a fluctuation in the quantity of light with a move of a laser spot along the tangent of the track. The clock mark is detected, using a photodetector divided perpendicular to the tangent of the track into two parts, as a differential signal, i.e., a tangential push-pull signal (TPP signal), supplied by those two parts of the photodetector. FIG. 7 shows how the TPP signal fluctuates. Cyclic clock signals are detected by binarizing the TPP signal using, for example, a zero-cross comparator.

The aforementioned detection of a clock signal from the clock mark allows the shape and other parameters of the clock mark to be specificized independently from the main information recorded by a magneto-optical recording technique. In addition, the use of TPP signals better prevents the conditions under which tracking is controlled from negatively affecting the detection of a clock signal than the use of push-bull signals. These factors contribute improvement of the quality of signals. Therefore, a clock can be reproduced with a relatively short mark length, and opens up a possibility to further increase the recording density, compared to the clock information recorded in wobbles whereby the side walls of a track groove are formed with wobbles.

Now, the conventional optical disk device will be explained. FIG. 8 shows a diagram representing an arrangement of major components of a recording and reproduction signal processing section for use with an optical disk. The optical disk 1 is rotated by a spindle motor 2. The optical disk 1 may be of any type; here, the explanation will be made based on the assumption that the optical disk 1 is a magneto-optical disk.

The optical disk 1 is irradiated on its bottom surface with a light beam projected through an objective lens 3 disposed on a pickup 4. The intensity of the light beam is suitably controlled by the LD drive circuit 6, and hence differs between recording and reproduction operations. The light reflected at the optical disk 1 is detected by a photodetector provided inside the pickup 4. The reflection is separated into a TPP signal, an RF signal, and a servo signal (not shown).

Bit clocks are generated from the TPP signal by a clock generation circuit 13. The foregoing description tells that only one clock signal is detected from each segment, because each segment contains only one clock mark; however, bit clocks are generated in plurality with a suitably increased ratio by means of a built-in PLL circuit in the clock generation circuit 13. Here, since each segment is specified to include 63.5 bytes of data, 508 (63.5 bytes×8 bits) bit clocks are generated per segment.

The generated bit clocks are supplied to data processing and other circuits, including a demodulation circuit 14, a modulation circuit 8, an A/D converter 11, a reproduction data processing circuit 15, and a recording data processing circuit 10 as necessary. The RF signal is sampled by the A/D converter 11, and then demodulated by the demodulator circuit 14.

The signal demodulated by the demodulator circuit 14 is transmitted to the reproduction data processing circuit 15, where the demodulated signal is processed so as to recover data therefrom. Errors found in the data recovered in the reproduction data processing circuit 15 are corrected in an error correction circuit 17.

For recording, the data with an additional error correction code provided in the error correction circuit 17 is sent to the recording data processing circuit 10, where the received data is divided into sets of data to be recorded in respective segments, so as to generate sector data. Each set of data is then modulated by the modulation circuit 8 into predetermined modulated signals. The modulated signals are translated into a magnetic field by a magnetic head drive circuit 7 and a magnetic head 5. The magnetic field in turn records information on the optical disk 1 in collaboration with a light beam emitted by the pickup 4.

Next, the conventional optical disk device will be explained in relation to its recording and reproduction operation.

First, the explanation will focus on the recording and reproduction operation performed by the conventional optical disk device under normal conditions, that is, when the clock mark is not defective.

For recording, the address recorded in advance in the address segment located at the head of the sector is all reproduced so as to confirm that the reproduced address matches the target address. If so confirmed, the data with an additional error correction code provided in the error correction circuit 17 is recorded in data segments.

For reproduction, the address segment located at the head of the sector is reproduced to confirm that the reproduced address matches the target address. If so confirmed, the data segment is reproduced. Only the data is recovered and transmitted to the error correction circuit 17, where error correction is performed in predetermined procedures. The conventional optical disk device thus performs recording and reproduction operation.

The recording and reproduction operation mentioned in the foregoing can be performed in a stable manner regardless of the quality of signals reproduced from a data field, because of the use of bit clocks generated from high-quality clock signals.

Incidentally, the detection of clock signals by means of clock marks boasts excellent performance. The method, however, is susceptible to disk flaws, because the use of clock marks enables the detection of clock signals with shorter mark lengths, but inevitably increases, with decreasing mark lengths, the likelihood of the presence of even a small flaw negatively affecting the clock mark. A normal clock signal cannot be detected from a clock mark, if the clock mark is defective due to a flaw.

Now, the explanation will focus on the recording operation performed by the conventional optical disk device with the optical disk 1 when a clock mark is defective due to a flaw.

FIG. 9 shows, in its top half, the position of data recorded on the optical disk 1 under normal conditions. The sets of data recorded in the respective data segments DS0 to DS44 are identical in size to each other, while the bit clocks in those data segments are also identical in number at 508 to each other; therefore, the data segments have equal lengths.

FIG. 9 shows, in its bottom half, the position of data recorded on the optical disk 1 when a clock mark is defective. Here, an example is taken where the clock mark located at the head of the data segment DS3 is defective. The defect of the clock mark disrupts normal generation of bit clocks in the clock generation circuit 13, resulting in the generation of bit clocks with a higher or lower frequency than that of the standard bit clocks. Whether the frequency of the bit clocks increases or decrease over that of the standard bit clocks is determined by variations in the frequency and other conditions of the bit clocks of the data segment DS3 and its preceding data segments. Here, the explanation will focus on bit clocks with a decreased frequency.

Since the frequency of the bit clocks decreases, the data is recorded in the data segment DS3 with extended mark lengths in comparison to standard mark lengths. The data, which would normally be recorded in its entirety in the data segment DS3, does not fit into the data segment DS3 with its tail spilling over into the head, i.e., the clock mark field, of the data segment DS4. Let us assume that the number of bits spilled over equals N.

The aforementioned explanation may be rephrased with a term, "the number of bit clocks in a data segment." The standard number of bit clocks in a data segment equals 508 as mentioned in the foregoing. However, the defect in the clock mark located at the head of the data segment DS3 lowers the frequency, that is, extends the cycle, of the bit clocks in the data segment DS3 and thereby reduces the number of the bit clocks to 507 or even further. Here, it is assumed that the number of bit clocks in the data segment DS3 equals 508-N.

Meanwhile, the clock mark located at the head of the data segment DS4 restores the frequency of the bit clocks to a standard-frequency, enabling the data after that to be recorded with normal mark lengths. However, since the data segment DS3 is extended by N bits in recording, the sets of data recorded in the data segments subsequent to the data segment DS3 are displaced by N bits. Hence, the last N bits of each set of data that should have been recorded in the data field of one of the data segments DS3 to DS44 are displaced and recorded in the clock mark field of the subsequent data segment. The displacement is corrected when the address segment located at the head of the subsequent sector is reproduced. Beginning from the first data segment of the subsequent sector, the data is recorded without being displaced.

Now, the explanation will focus on the reproduction operation performed by the conventional optical disk device when the data includes some bits that are displaced in a recording operation. The reproduction data processing circuit 15 includes a built-in buffer memory for temporarily recording data. FIG. 10 shows, in its top half, the position of data recorded in the buffer memory under normal conditions, and, in its bottom half, the position of data recorded in the buffer memory when the clock mark is defective.

The arrangement of reproduction data in the buffer memory is determined by bit clocks from the clock generation circuit 13. The defect is present only in the clock mark field of the data segment DS3. Therefore, up to the data segment DS2, the data is not at all affected by the defect: the data can be reproduced correctly and arranged in standard position At the head of the data segment DS3 where the clock mark is defective due to a flaw, clocks are not generated normally in a data reproduction operation. Hence, the frequency of the clocks is increased or decreased over the standard frequency.

Supposing that the frequency of the bit clocks deviates identically in recording and reproduction operations, the data in the data segment DS3 can be reproduced normally except the last N bits recorded in the clock mark field of the data segment DS4.

However, typically, conditions differ between recording and reproduction operations, and hence the frequency does not deviate identically. When this is the case, the number of bit clocks in the data segment DS3 in a reproduction operation differs from that in a recording operation, obstructing normal reproduction. Let us assume here that the difference of bit clocks in number between recording and reproduction operations corresponds to M bits.

At the head of the data segment DS4 where another clock mark is located, the frequency of the bit clocks is restored to a standard, enabling error-free reproduction of data in the data segment DS4 and its subsequent data segments. Note that the aforementioned displaced N bits cannot be reproduced, because they have failed to be recorded in a standard segment range, spilling over into the head of the subsequent data segment. In other words, in each of the data segments DS4 to DS44, the last N bits of data are lost, whereas the rest of the data is reproduced normally.

The data is reproduced correctly on a bit-by-bit basis. However, if the number of clocks corresponding to the data segment DS3 differs between recording and reproduction operations, the data in the data segment DS4 and its subsequent data segments is not divided correctly into 1-byte pieces of data. Typically, data reproduction, error correction, and other operations are performed on a byte-by-byte basis; if the data is not correctly divided into 1-byte sets of data, the data cannot be reproduced correctly.

As mentioned in the foregoing, in the data segment DS3, there exists a difference in the number of bit clocks between recording and reproduction operations, corresponding to M bits. Therefore, the data in the data segment DS4 and its subsequent data segments are displaced by M bits, causing none of that data to be reproduced correctly. FIG. 10 shows the data being displaced by M bits off a standard data position.

In short, if, the conventional optical disk and optical disk device fails to correctly detect the clock signal, the data-is displaced and cannot be recorded and reproduced.

SUMMARY OF THE INVENTION

The present invention, in view of the above problems, has an object to offer an optical disk, an optical reproduction device, and an optical recording device that are capable of performing highly reliable recording and reproduction even if a clock mark is defective due to a flaw.

In order to achieve the object, an optical disk in accordance with the present invention is characterized in that it includes data segments, for recording data, provided in each sector in a recording track, wherein at least some of the data segments each include:

a clock mark field for recording a clock mark from which a clock signal is obtained; and a synchronization field for recording a synchronization pattern with which displacement of data is corrected.

With the arrangement above, data segments for recording data are provided in each sector in a recording track.

Conventionally, a clock mark is used in detection of a clock signal so as to reproduce the clock signal, which constitutes important information, without error. However, the clock mark has a drawback where it easily becomes defective even due to a small flaw in the optical disk. A normal clock signal cannot be obtained from a clock mark, if the clock mark is defective, displacing the data off standard position. Conventionally, if a defective clock mark exists in the optical disk, all data after the displaced data includes an error in the sequential reproduction of the data, failing to reproduce large data correctly.

Accordingly, by adopting the arrangement in accordance with the present invention, at least some of the data segments have a clock mark field and a synchronization field, a clock signal is obtained from the clock mark recorded in the clock mark field, and the displacement of data can be corrected according to the synchronization pattern recorded in the synchronization field.

In other words, the displacement of the data caused by a defective clock mark can be corrected according to the synchronization pattern recorded in the synchronization field in the data segment for subsequent data so as to restore the data in subsequent data segments to standard position. Therefore, the error caused by the displacement is confined to a minimum amount of data, allowing large data to be reproduced correctly.

Further, in order to achieve the object, an optical reproduction device in accordance with the present invention is an optical reproduction device for reproducing data recorded in data segments provided in each sector in a recording track of an optical disk, the optical reproduction device is characterized in that it includes:

a clock generation circuit for generating a clock signal from a clock mark recorded in a clock mark field provided in the data segments; and a data rearrangement circuit for detecting a synchronization pattern recorded in a synchronization field provided in at least some of the data segments to correct displacement of the data according to the detected synchronization pattern.

A defect in the clock mark obstructs the generation of a correct clock signal by the clock generation circuit and causes displacement of the data when recorded; however, with the arrangement above, the displacement can be corrected according to the synchronization pattern detected by the data rearrangement circuit. Therefore, the data in the data segments subsequent to the data segment for the displaced data can be reproduced correctly. This realizes highly reliable recording and reproduction with few data errors.

Further, in order to achieve the object, an optical recording device in accordance with the present invention is an optical recording device for-recording data in data segments provided in each sector in a recording track of an optical disk, the optical recording device is characterized in that it includes:

a clock generation circuit for generating a clock signal for use in recording of the data; and a synchronization pattern addition circuit for adding a synchronization pattern for correcting displacement of the data to data recorded in at least some of the data segments.

With the arrangement above, a synchronization pattern is added to data recorded in at least some of the data segments; therefore, even if a defective clock mark causes the data to be displaced when recorded, the data in the data segments subsequent to the data segment for the data displaced can be recorded correctly by correcting the displacement according to a synchronization pattern in a data segment subsequent to the data segment for the displaced data. Therefore, the error caused by the displacement is confined to a minimum amount of data, allowing large data to be reproduced correctly. This realizes highly reliable recording and reproduction with few data errors.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) to FIG. 1(c) are explanatory drawings showing a format of an optical disk of an embodiment in accordance with the present invention.

FIG. 2 is an explanatory drawing showing kinds of information recorded in a data segment of an optical disk of an embodiment in accordance with the present invention.

FIG. 6(a) to FIG. 6(c) are explanatory drawings showing a format of a conventional optical disk.

DESCRIPTION OF THE EMBODIMENTS

Figure 3:
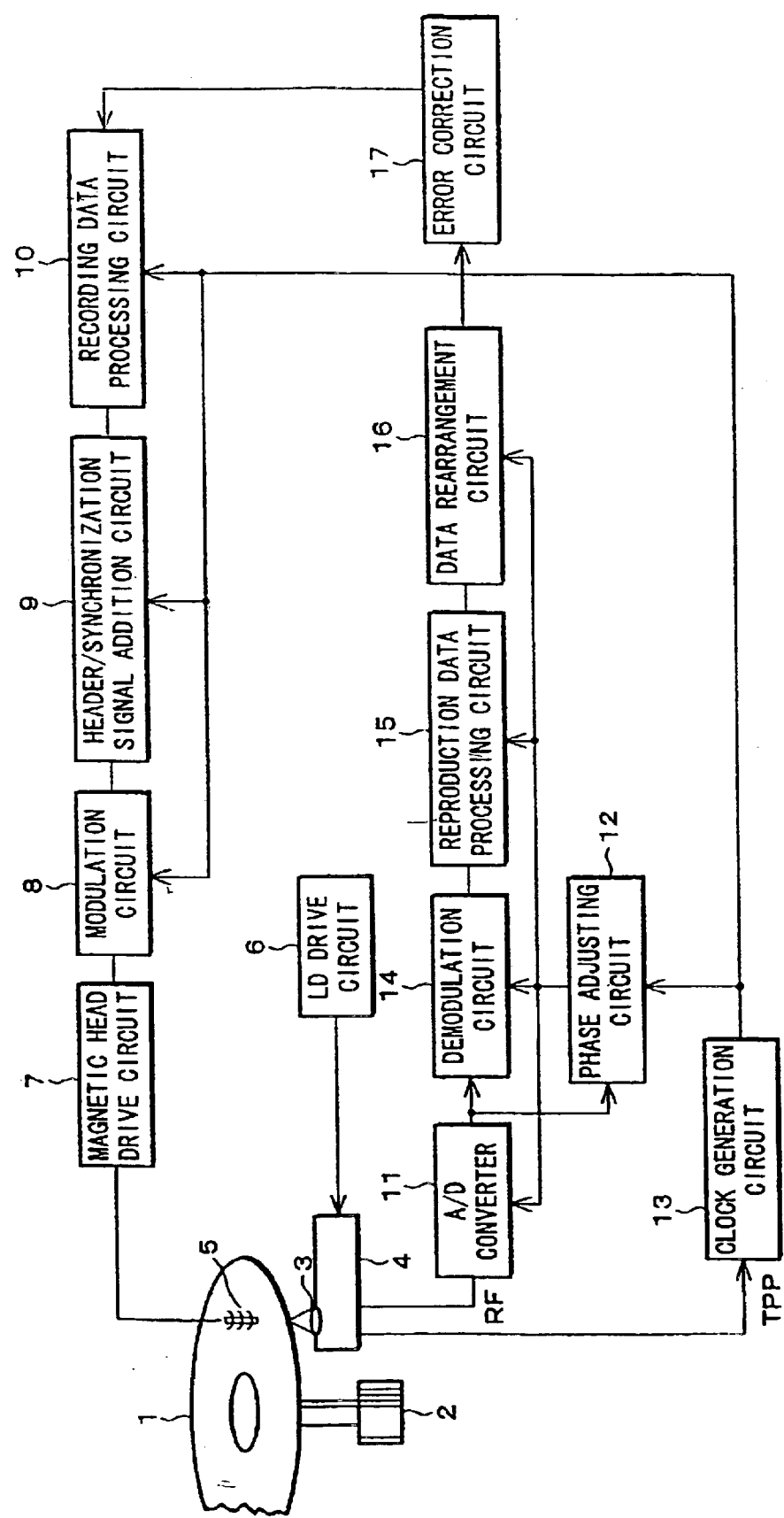
FIG. 3 is a block diagram showing an optical disk drive (optical recording device, optical reproduction device) of an embodiment in accordance with the present invention.

Referring to the drawings, the following description will discuss an embodiment in accordance with the present invention.

FIG. 1(a) to FIG. 1(c) are explanatory drawings showing a format of an optical disk in accordance with the present invention. FIG. 1(a) shows an arrangement of a sector. Each sector is constituted by two address segments AS0 and AS1 and 45 data segments DS0 to DS44. The number of the address segments and data segments shown here may be changed according to use.

FIG. 1(b) shows an arrangement of an address segment. The address segments AS0 and AS1 each include a clock mark field (CM field), an address field, a preamble field, and other fields. In each field, a predetermined signal is recorded in advance in the form of a variation in the shape of a pit or a groove.

The clock mark field records in advance a clock mark from which a clock signal is generated as mentioned in the foregoing. The address field records the address of the sector. The other fields are provided as necessary so as to control address readout or ensure a readout margin.

FIG. 1(c) shows an arrangement of a data segment. The data segment is constituted by a clock mark field (CM field), a pre-write field, a post-write field, and a data field. The clock mark field in the data segment records a clock mark as does the clock mark field in the address segment. The clock mark field (clock field) is designed so as to have a different light reflectance from that of the data field. The pre-write and post-write fields are for offsetting the displacement of data that occur in a recording operation. The preceding and subsequent data segments are not negatively affected by the displacement of data that occur in a recording operation, provided that the displacement is confined within this range.

Each segment is 63.5 byte long, for example. Clock marks are then found at identical intervals equaling 63.5 bytes.

FIG. 2 is an explanatory drawing showing sets of data recorded in respective data segments. The data field of the first data segment DS0 after the two address segments records a pattern called header pattern. The header pattern is used to match the clock and the data in phase, and is selected so as to suitably achieve that purpose. Suitable, specific examples include a cyclic pattern where the edge of data does not change its position.

The subsequent data segments DS1 to DS44 record data, and include synchronization fields each provided for every predetermined number of data segments in the data field. In FIG. 2, "S" denotes a synchronization field. In the present embodiment, a synchronization field is provided for every two data segments. A rarely occurring pattern that produces high quality signals and has relatively long mark lengths is selected as the synchronization pattern recorded in the synchronization field.

Now, the following description will discuss an optical disk device of an embodiment in accordance with the present invention. FIG. 3 is a block diagram representing an arrangement of major components of a recording and reproduction signal processing section for use with an optical disk. The optical disk 1 is rotated by a spindle motor 2. The optical disk 1 may be of any type; here, the description will be made based on the assumption that the optical disk 1 is a magneto-optical disk.

The optical disk 1 is irradiated on its bottom surface with a light beam projected through an objective lens 3 disposed on a pickup 4. The intensity of the light beam is suitably controlled by the LD drive circuit 6, and hence differs between recording and reproduction operations. The light reflected at the optical disk 1 is detected by a photodetector provided inside the pickup 4. The reflection is separated into a TPP signal, an RF signal, and a servo signal (not shown).

Bit clocks are generated from the TPP signal by a clock generation circuit 13 (clock generate means). The foregoing description tells that only one clock signal is detected from each segment, because each segment contains only one clock mark; however, bit clocks are generated in plurality with a suitably increased ratio by means of a built-in PLL circuit in the clock generation circuit 13. Here, supposing that each segment is specified to include 63.5 bytes of data for example, 508 (63.5 bytes×8 bits) bit clocks are generated per segment.

The generated bit clocks are supplied to data processing and other circuits, including a demodulation circuit 14, a modulation circuit 8, an A/D converter 11, a reproduction data processing circuit 15, and a recording data processing circuit 10 as necessary. The RF signal is sampled by the A/D converter 11, and then demodulated by the demodulator circuit 14.

The modulation and demodulation may possibly be performed by various techniques: NRZI is an example suitable for use in high density recording and reproduction, since the technique allows for a great window width in a data reproducing operation. The window width refers to a tolerant width for the recording position of data. The greater the window width, the greater the tolerant width for displacement, i.e., jitter, of data. For example, the window width equals 0.5 T in 8/16modulation used with a DVD (Digital Video Disk) and the like, while the window width equals 1T in NRZI, meaning that the latter boasts a tolerant width twice that of the former.

The signal demodulated by the demodulator circuit 14 is transmitted to the reproduction data processing circuit 15, where the demodulated signal is processed so as to recover data therefrom. The phase adjusting circuit 12 adjusts a phase according to signals from the clock generation circuit 13 and the A/D converter 11. The data rearrangement circuit (synchronization pattern detection means, reproduction means) 16 rearranges the data according to the synchronization signal contained in the data. Errors found in the rearranged data are corrected in an error correction circuit 17.

For recording, the data with an additional error correction code provided in the error correction circuit 17 is sent to the recording data processing circuit 10, where the received data is divided into sets of data to be recorded in respective segments. A header/synchronization signal addition circuit (synchronization pattern addition circuit) 9 adds a resynchronization pattern and a header pattern to the output from the recording data processing circuit 10 so as to generate sector data. Each set of data is then modulated by the modulation circuit 8 into NRZI codes. The signals modulated into NRZI codes are translated into a magnetic field by a magnetic head drive circuit 7 and a magnetic head 5. The magnetic field in turn records information on the optical disk 1 in collaboration with a light beam emitted by the pickup 4.

First, the explanation will focus on the recording and reproduction operation under normal conditions, that is, when the clock mark is not defective.

For recording, the address recorded in advance in the address segment located at the head of the sector is reproduced so as to confirm that the reproduced address matches the target address. If so confirmed, a header pattern for introducing a phase is recorded in the first data segment. The data with an additional error correction code provided in the error correction circuit 17 is recorded in the subsequent data segments. Further, recording means records a synchronization pattern as well as data for every predetermined number of data segments. The recording means is constituted by the header/synchronization signal addition circuit 9, the recording, data processing circuit 10, the modulation circuit 8, the magnetic head drive circuit 7, a magnetic head 5, a pickup 4, an objective lens 3, and an LD drive circuit 6.

For reproduction, the address segment located at the head of the sector is reproduced to confirm that the reproduced address matches the target address. If so confirmed, the bit clocks generated by the clock marks are adjusted in phase with the header pattern by using the header pattern recorded in the first data segment.

Specifically, the phase adjusting circuit 12 is adjusted so that the data signal supplied to the reproduce data process circuit 15 matches with the bit clock signal in phase according to the comparison of the two signals. The phase adjustment serves as a correction of the deviation in phase caused by the difference in the recording and reproduction method between the clock mark recorded in the form of a fine variation in the shape of the optical disk 1 and the data recorded in the form of magneto-optic signals. The effects of the deviation in phase can be eliminated by the provision of the header pattern in the data segment DS0 located at the head of the sector and the adjustment of the phase using the header pattern.

Subsequently, an immediately following data segment is reproduced. Since a synchronization pattern is provided for every predetermined number of data segments, the data rearrangement circuit 16 detects a synchronization pattern, and byte synchronization is performed where data is rearranged with positions dividing a set of data into 1-byte subsets of data being used as standard positions.

The synchronization pattern is detected only in proximity to a synchronization pattern in a data segment. Specifically, the data rearrangement circuit 16 includes an internal window circuit (window means) by means of which the synchronization pattern is detected only in a certain period of time following a predetermined period of time after a reference position signal such as the clock mark in a segment. With such a circuit arrangement, the synchronization pattern is not detected in a data field; therefore, a data pattern, found in data, identical or similar to the synchronization pattern can be prevented from wrongly detected as being a synchronization pattern.

Only the data which has been rid of the synchronization pattern and other command signals and has undergone byte synchronization in the data rearrangement circuit 16 is transmitted to the error correction circuit 17, where error correction is performed in predetermined procedures. The optical disk device thus performs recording and reproduction operation.

Now, the explanation will focus on the recording operation performed with the optical disk 1 when a clock mark is defective due to a flaw.

Figure 4:
FIG. 4 is an explanatory drawing showing the position of data on a disk of an embodiment in accordance with the present invention.

FIG. 4 shows, in its top half, the position of data recorded on the optical disk 1 under normal conditions. The sets of data recorded in the respective data segments DS0 to DS44 are identical in size to each other, while the bit clocks in those data segments are also identical in number at 508 to each other; therefore, the data segments have equal lengths.

FIG. 4 shows, in its bottom half, the position of data recorded on the optical disk 1 when a clock mark is defective. Here, an example is taken where the clock mark located at the head of the data segment DS3 is defective. The defect of the clock mark disrupts normal generation of bit clocks in the clock generation circuit 13, resulting in the generation of bit clocks with a higher or lower frequency than that of the standard bit clocks. Whether the frequency of the bit clocks increases or decrease over that of the standard bit clocks is determined by variations in the frequency and other conditions of the bit clocks of the data segment DS3 and its preceding data segments. Here, the explanation will focus on bit clocks with a decreased frequency.

As the frequency of the bit clocks decreases, the data is recorded in the data segment DS3 with extended mark lengths in comparison to standard mark lengths. The data, which would normally be recorded in its entirety in the data segment DS3, does not fit into the data segment DS3 with its tail spilling over into the head, i.e., the clock mark field, of the data segment DS4. Let us assume that the number of bits spilled over equals N.

The aforementioned explanation may be rephrased with a term, "the number of bit clocks in a data segment." The standard number of bit clocks in a data segment equals 508 as mentioned in the foregoing. However, the defect in the clock mark located at the head of the data segment DS3 lowers the frequency, that is, extends the cycle, of the bit clocks in the data segment DS3 and thereby reduces the number of the bit clocks to 507 or even further. Here, it is assumed that the number of bit clocks in the data segment DS3 equals 508-N.

Meanwhile, the clock mark located at the head of the data segment DS4 restores the frequency of the bit clocks to a standard frequency, enabling the data after that to be recorded with normal mark lengths. However, since the data segment DS3 is extended by N bits in recording, the sets of data recorded in the data segments subsequent to the data segment DS3 are displaced by N bits. Hence, the last N bits of each set of data that should have been recorded in the data field of one of the data segments DS3 to DS44 are displaced and recorded in the clock mark field of the subsequent data segment. The displacement is corrected when the address segment located at the head of the subsequent sector is reproduced. Beginning from the first data segment of the subsequent sector, the data is recorded without being displaced.

Figure 5:
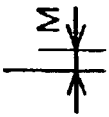
FIG. 5 is an explanatory drawing showing the position of data in a buffer memory provided in a data rearrangement circuit of an optical disk drive of an embodiment in accordance with the present invention.
Figure 7:
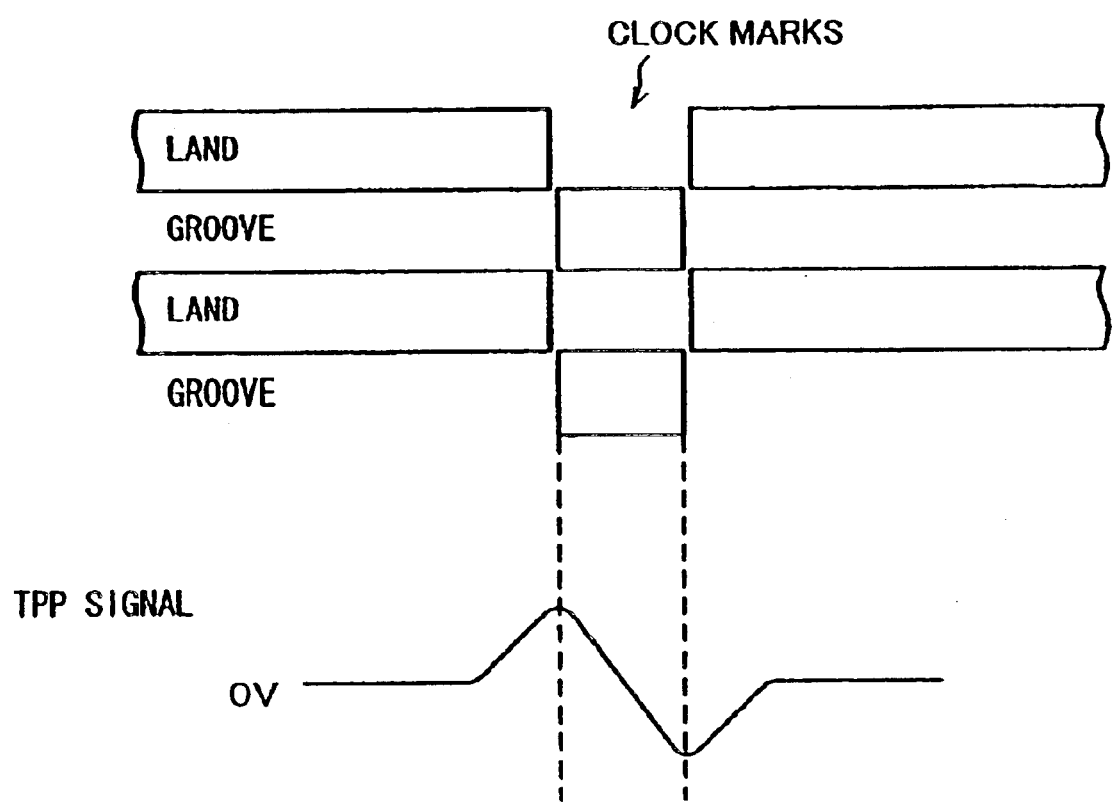
FIG. 7 is an explanatory drawing showing clock marks and a fluctuation in a TPP signal caused by a clock mark on a conventional optical disk.
Figure 8:
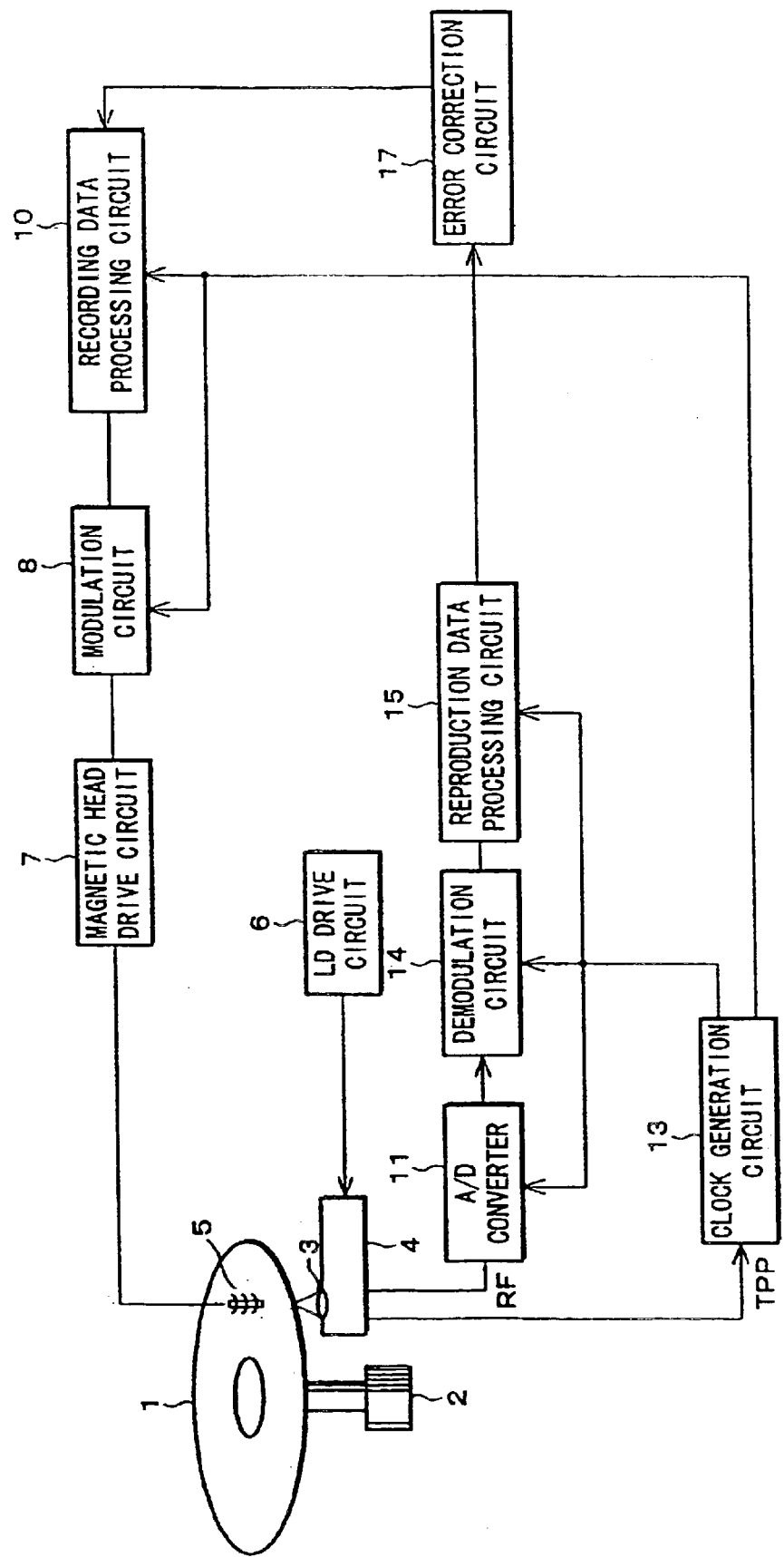
FIG. 8 is a block diagram showing a conventional optical disk drive (optical recording device, optical reproduction device).
Figure 9:
FIG. 9 is an explanatory drawing showing the position of data recorded on a conventional optical disk.
Figure 10:
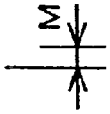
FIG. 10 is an explanatory drawing showing the position of data recorded on a buffer memory used with a conventional optical disk device.

Now, the explanation will focus on the reproduction operation when the data includes some bits that are displaced in a recording operation. The data rearrangement circuit 16 includes a built-in buffer memory for temporarily recording data. FIG. 5 shows, in its top half, the position of data recorded in the buffer memory under normal conditions, and, in its bottom half, the position of data recorded in the buffer memory when the clock mark is defective.

The defect is present only in the clock mark field of the data segment DS3. Therefore, up to the data segment DS2, the data is not at all affected by the defect: the data can be reproduced correctly and arranged in standard position. At the head of the data segment DS3 where the clock mark is defective due to a flaw, clocks are not generated normally in a data reproduction operation. Hence, the frequency of the clocks is increased or decreased over the standard frequency. Supposing that the frequency of the bit clocks deviates identically in recording and reproduction operations, the data in the data segment DS3 can be reproduced normally except the last N bits recorded in the clock mark field of the data segment DS4. However, typically, conditions differ between recording and reproduction operations, and hence the frequency does not deviate identically. When this is the case, the number of bit clocks in the data segment DS3 in a reproduction operation differs from that in a recording operation, obstructing normal reproduction. Let us assume here that the difference of bit clocks in number between recording and reproduction operations corresponds to M bits.

At the head of the data segment DS4 where another clock mark is located, the frequency of the bit clocks is restored to a standard, enabling error-free reproduction of data in the data segment DS4 and its subsequent data segments. Note that the aforementioned displaced N bits cannot be reproduced, because they have failed to be recorded in a standard segment range, spilled over into the head of the subsequent data segment. In other words, in each of the data segments DS4 to DS44, the last N bits of data are lost, whereas the rest of the data is reproduced normally.

The data is reproduced correctly on a bit-by-bit basis. However, if the number of clocks corresponding to the data segment DS3 differs between recording and reproduction operations, the data in the data segment DS4 and its subsequent data segments is not divided correctly into 1-byte pieces of data.

Accordingly, in the present embodiment, a synchronization pattern is recorded in every two data segments as mentioned in the foregoing. The synchronization pattern is detected, and the data is rearranged by the data rearrangement circuit 16 so as to be correctly divided into 1-byte pieces of data. The first synchronization pattern after that in the data segment DS3 is recorded in the data segment DS5; therefore, as the synchronization pattern recorded in the data segment DS5 is detected, the data is brought forward by M bits.

FIG. 5 shows, in its bottom half, the position of data recorded in the buffer memory after the data is rearranged. As can be shown here, the data in the data segment DS5 and its subsequent data segments is rearranged into the same position that is identical to the standard data position shown in the top half of FIG. 5. The data thereby can be divided into 1-byte pieces, i.e., re-synchronized, in a reproduction operation.

In the present embodiment, the explanation has so far focused on bit clocks with a decreased frequency due to a missing clock mark. However, it would be clear that, when the present embodiment is applied to bit clocks with an increased frequency, the same explanation holds true except that the deviation of data by N or M bits occurs in the opposite direction, and the present embodiment therefore has the same advantages.

Further, in the present embodiment, a synchronization pattern is so far recorded in every two data segments. If a synchronization pattern is recorded in every data segment for example, the data is rearranged in the data segment DS4 and thereby divided correctly into 1-byte pieces; therefore, the data is re-synchronized earlier than in the present embodiment. A tradeoff is that the fields used as synchronization fields double in number, which leaves less data fields available for use by the user. As can be observed here, the frequency in provision of the synchronization patterns and the amount of data available for use by the user cannot be increased simultaneously, and hence are determined according to use. When reliability should be given a higher priority, the frequency in provision of the synchronization patterns is increased; by contrast, when the amount of data should be given a higher priority, the frequency in provision of the synchronization pattern is decreased.

Besides, the intervals between the synchronization patterns may be varied; however, identical intervals are preferred as in the present embodiment. If the synchronization patterns are not provided at regular intervals with one of them being longer than the others, and the clock mark is missing in the longer interval, it takes longer before the data is re-synchronized. By contrast, if the synchronization patterns are provided at regular intervals, and a clock mark is missing on any given part of the disk, the data is re-synchronized after a certain period of time.

Moreover, the synchronization pattern preferably has a fixed position in the segment as it is in the present embodiment. The synchronization pattern is selected so that an identical pattern rarely occurs; however, a possibility is that a pattern identical to the synchronization pattern appears mixed in a reproduction signal due to a defect. Also, in some modulation schemes, such a rarely occurring pattern cannot be selected. If the synchronization pattern has a fixed position in the segment, an arrangement is readily made so that the detection of synchronization patterns is performed only in proximity to where the synchronization pattern is expected to be found, not in those places where no synchronization pattern is expected to be found, which eventually prevents the synchronization pattern from wrongly detected.

As detailed so far, if a clock mark is defective due to a flaw, the present embodiment is capable of restoring the data division to byte-to-byte basis at the data segment where a next synchronization pattern exits. Thus, a highly reliable optical disk and optical disk device can be realized that are capable of preventing bit displacement caused by a defective clock mark from resulting in the data erroneously recorded in all subsequent data segments.

An optical disk in accordance with the present invention may be arranged so that the optical disk has a recording track constituted by sectors arranged in a concentric or spiral form, in which data is rewritable sector by sector, wherein each of the sectors is divided into segments, each of the segments includes a data field for recording data and a clock field having a different light reflectance from that of the data field, and the data field includes fields for recording a synchronization pattern.

The optical disk in accordance with the present invention may be arranged so that each of the sectors includes at least one address segment where address information is located and data segments for recording data, the address segment is located at a head of the sector, a first data segment immediately subsequent to the address segment includes a field for recording a phase-introducing header pattern for use in data reproduction, and the fields for recording the synchronization pattern are included at regular intervals in a second data segment immediately- subsequent to the first data segment and data segments subsequent to the second data segment.

An optical reproduction device in accordance with the present invention may be an optical reproduction device for reproducing data from an optical disk with a recording track constituted by sectors arranged in a concentric or spiral form, in which data is rewritable sector by sector, wherein each of the sectors is divided into segments, each of the segment includes data fields for recording data and a clock field having a different light reflectance from that of the data fields, and the data fields record synchronization patterns, and the optical reproduction device may be arranged so that it includes:

clock generation means for detecting a laser reflected at the clock field as a clock field signal and generating a clock for use in data reproduction according to the clock field signal;

synchronization pattern detection means for detecting the synchronization pattern recorded in the data fields;

reproduction means for reproducing sector by sector using the clock generated by the clock generation means and correcting displacement of data in the sector according to a result of the detection of the synchronization pattern.

The optical reproduction device in accordance with the present invention may be arranged so that the synchronization pattern detection means includes window means for detecting the synchronization pattern only in a predetermined part in the data fields.

An optical recording device in accordance with the present invention may be an optical recording device for recording data on an optical disk with a recording track constituted by sectors arranged in a concentric or spiral form, in which data is rewritable sector by sector, wherein each of the sectors is divided into segments, and each of the segment includes a data field for recording data and a clock field having a different light reflectance from that of the data field, and the optical recording device may be arranged so that it includes:

clock generation means for detecting a laser reflected at the clock field as a clock field signal and generating a clock for use in data recording according to the clock field signal; and recording means for recording synchronization patterns, together with recording data, in each data field at a predetermined cycle.

The optical disk in accordance with the present invention has synchronization patterns as well as clock marks; therefore, despite a missing clock mark, displacement of data can be corrected in each sector according to the synchronization pattern provided in the data field, enabling highly reliable recording and reproduction to be performed with few errors.

Further, if a further arrangement is made so that each of the sectors includes at least one address segment where address information is located and data segments for recording data the address segment is located at the head of the sector, a phase-introducing header pattern for use in data reproduction is located in a first data segment immediately subsequent to the address segment, and the synchronization patterns are provided at regular intervals in a second data segment immediately subsequent to the first data segment and data segments subsequent to the second data segment, the clock and data can be adjusted in phase by using the header pattern in the first data segment after the address information located at the head of the sector is read. Further, since the synchronization patterns are provided at regular intervals, displacement of the data can be corrected after a certain period of time regardless of where the clock mark is missing. This advantage is enjoyed uniformly in any part of the disk.

The optical reproduction device in accordance with the present invention reproduces sector by sector using the clock generated from the clock mark and corrects the displacement of the data in the sector according to a result of the detection of the synchronization pattern; therefore, despite a displacement of data caused when recorded by a missing clock mark, the displacement of the data is corrected in a sector according to the synchronization pattern, enabling normal reproduction and giving more reliability to the optical reproduction device.

Further, if window means is used so that the synchronization pattern is detected only in a predetermined part in the data segment, the synchronization pattern becomes detectable with few errors and high reliability.

The recording device in accordance with the present invention optical records synchronization patterns; therefore, despite a missing clock mark, the displacement of the data can be corrected in a sector according to the synchronization pattern provided in the data field, enabling highly reliable recording and reproduction to be performed with few data errors.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical disk including data segments, for recording data, provided in each sector in a recording track, wherein:
   at least some of the data segments each include:
   a pre-write region by which displacement of the data upon recording is adjusted;
   a clock mark field for recording a clock mark from which a clock signal is obtained; and
   a synchronization field for recording a synchronization pattern with which displacement of the data is corrected.

2. The optical disk as set forth in claim 1, wherein
the at least some of the data segments including a synchronization field are provided at regular intervals in each sector.

3. The optical disk as set forth in claim 1, wherein
the synchronization field has a fixed position in each of the data segments.

4. The optical disk as set forth in claim 1, wherein
one of the data segments, located at a head of each sector, records a header pattern for matching the clock signal and the data in phase.

5. The optical disk as set forth in claim 1, wherein
the data segments each include a post-write field for offsetting displacement of the data that occurs when the data is recorded.

6. An optical disk with a recording track constituted by sectors arranged in a concentric or spiral form, in which data is rewritable sector by sector, wherein
each of the sectors is divided into segments,
each of the segments includes a data field for recording data and a clock field having a different light reflectance from that of the data field, and
the data field includes fields for recording a synchronization pattern with which displacement of the data is corrected.

7. The optical disk as defined in claim 6, wherein
each of the sectors includes at least one address segment where address information is located and data segments for recording data,
the address segment is located at a head of the sector,
a first data segment immediately subsequent to the address segment includes a field for recording a phase-introducing header pattern for use in data reproduction, and
the fields for recording the synchronization pattern are included at regular intervals in a second data segment immediately subsequent to the first data segment and data segments subsequent to the second data segment.

8. An optical reproduction device for reproducing data recorded in data segments provided in each sector in a recording track of an optical disk, said optical reproduction device comprising:
a clock generation circuit for generating a clock signal from a clock mark recorded in a clock mark field provided in the data segments; and
a data rearrangement circuit for detecting a synchronization pattern recorded in a synchronization field provided in at least some of the data segments to correct displacement of the data according to the detected synchronization pattern.

9. The optical reproduction device as set forth in claim 8, wherein
the data rearrangement circuit detects the synchronization pattern in each sector of the optical disk at regular intervals.

10. The optical reproduction device as set forth in claim 8, wherein
the data rearrangement circuit includes a window circuit for detecting the synchronization pattern only in proximity to the synchronization field.

11. The optical reproduction device as set forth in claim 8, further comprising:
a phase adjusting circuit for matching the data and the clock signal in phase using a header pattern recorded in one of the data segments located at a head of each sector of the optical disk.

12. The optical reproduction apparatus as set forth in claim 8, wherein
the data rearrangement circuit rearranges the positions of the data by detecting the synchronization pattern, so that reproduced data is divided into 1-byte subsets of data at standard positions.

13. An optical reproduction device for reproducing data from an optical disk with a recording track constituted by sectors arranged in a concentric or spiral form, in which data is rewritable sector by sector, wherein
each of the sectors is divided into segments, each of the segments includes data fields for recording data and a clock field having a different light reflectance from that of the data fields, and the data fields record synchronization patterns, said optical reproduction device comprising:
clock generation means for detecting a laser reflected at the clock field as a clock field signal and generating a clock for use in data reproduction according to the clock field signal;
synchronization pattern detection means for detecting the synchronization pattern recorded in the data fields;
reproduction means for reproducing sector by sector using the clock generated by the clock generation means and correcting displacement of data in the sector according to a result of the detection of the synchronization pattern.

14. The optical reproduction device as set forth in claim 13, wherein
the synchronization pattern detection means includes window means for detecting the synchronization pattern only in a predetermined part in the data fields.

15. The optical reproduction apparatus as set forth in claim 13, wherein
the reproduction means corrects displacement of data by detecting the synchronization pattern, so that reproduced data is divided into 1-byte subsets of data at standard positions.

16. An optical recording device for recording data on an optical disk with a recording track constituted by sectors arranged in a concentric or spiral form, in which data is rewritable sector by sector, wherein
each of the sectors is divided into segments, and each of the segments includes a data field for recording data and a clock field having a different light reflectance from that of the data field,
the optical recording device comprising:
clock generation means for detecting a laser reflected at the clock field as a clock field signal and generating a clock for use in data recording according to the clock field signal; and
recording means for recording synchronization patterns for correcting displacement of data, together with recording data, in each data field using the clock at a predetermined cycle.

* * * * *